US012698971B2

(12) United States Patent
Aizawa et al.

(10) Patent No.: US 12,698,971 B2
(45) Date of Patent: Aug. 4, 2026

(54) MOVING BODY CONTROL SYSTEM, CONTROL METHOD, STORAGE MEDIUM, AND MOVING BODY

(71) Applicant: HONDA MOTOR CO., LTD., Tokyo (JP)

(72) Inventors: Koki Aizawa, Wako (JP); Ryoji Wakayama, Wako (JP); Kento Shirakata, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/180,635

(22) Filed: Apr. 16, 2025

(65) Prior Publication Data

US 2025/0264336 A1    Aug. 21, 2025

Related U.S. Application Data

(63) Continuation of application No. PCT/JP2022/039961, filed on Oct. 26, 2022.

(51) Int. Cl.
| | |
|---|---|
| *G01C 21/30* | (2006.01) |
| *B60W 60/00* | (2020.01) |
| *G06V 20/56* | (2022.01) |

(52) U.S. Cl.
CPC ........... *G01C 21/30* (2013.01); *B60W 60/001* (2020.02); *G06V 20/588* (2022.01);
(Continued)

(58) Field of Classification Search
CPC . G01C 21/30; B60W 60/001; B60W 2300/34; B60W 2420/403; B60W 2520/10; B60W 2552/20; G06V 20/588
See application file for complete search history.

(56) References Cited

U.S. PATENT DOCUMENTS

| | | |
|---|---|---|
| 7,778,758 B2 | 8/2010 | Tsuchiya et al. |
| 10,176,387 B2 | 1/2019 | Kawasaki et al. |
| | (Continued) | |

FOREIGN PATENT DOCUMENTS

| | | |
|---|---|---|
| JP | 2008087726 A | 4/2008 |
| JP | 2016-043837 A | 4/2016 |
| | (Continued) | |

OTHER PUBLICATIONS

Machine Translation of Goto's reference (JP2022110604-A) (Year: 2022).*

(Continued)

*Primary Examiner* — Tarek Elarabi
(74) *Attorney, Agent, or Firm* — THOMAS | HORSTEMEYER, LLP

(57) ABSTRACT

A moving body control system of the present invention comprises: acquiring a captured image of a travel area of a destination of a moving body; recognizing a road shape included in the captured image; and generating a path of the moving body based on the road shape recognized by the recognition means. In the path generation, when the recognition means recognizes a road shape including an entrance section and at least one exit section accompanied by a course change, a first path from a current position of the moving body to the entrance section, and a second path from the entrance section to an exit section to be identified in accordance with indication information about the destination of the moving body are generated.

12 Claims, 9 Drawing Sheets

(52) U.S. Cl.
CPC ... *B60W 2300/34* (2013.01); *B60W 2420/403*
(2013.01); *B60W 2520/10* (2013.01); *B60W*
*2552/20* (2020.02)

(56) References Cited

U.S. PATENT DOCUMENTS

| | | | |
|---|---|---|---|
| 11,247,692 B2 * | 2/2022 | Ohara ................... | G06V 20/58 |
| 2015/0134204 A1 | 5/2015 | Kunihiro et al. | |
| 2019/0225231 A1 * | 7/2019 | Ohara ............. | B60W 30/18154 |
| 2024/0166205 A1 * | 5/2024 | Aizawa .............. | B60W 30/143 |

FOREIGN PATENT DOCUMENTS

| | | | |
|---|---|---|---|
| JP | 2019-128614 A | | 8/2019 |
| JP | 2021-117039 A | | 8/2021 |
| JP | 2022110604 A | * | 7/2022 |
| WO | 2014/006759 A1 | | 1/2014 |
| WO | 2024/089810 A1 | | 5/2024 |

OTHER PUBLICATIONS

International Search Report for PCT/JP2022/039961 mailed Jan.
10, 2023 with partial English Translation.
Office Action dated Dec. 12, 2025, concerning Japanese Patent
Application No. 2024-552591 with machine translation.
Extended European Search Report for EP Application No. 22963459.7
mailed Oct. 7, 2025.

* cited by examiner

F I G. 2
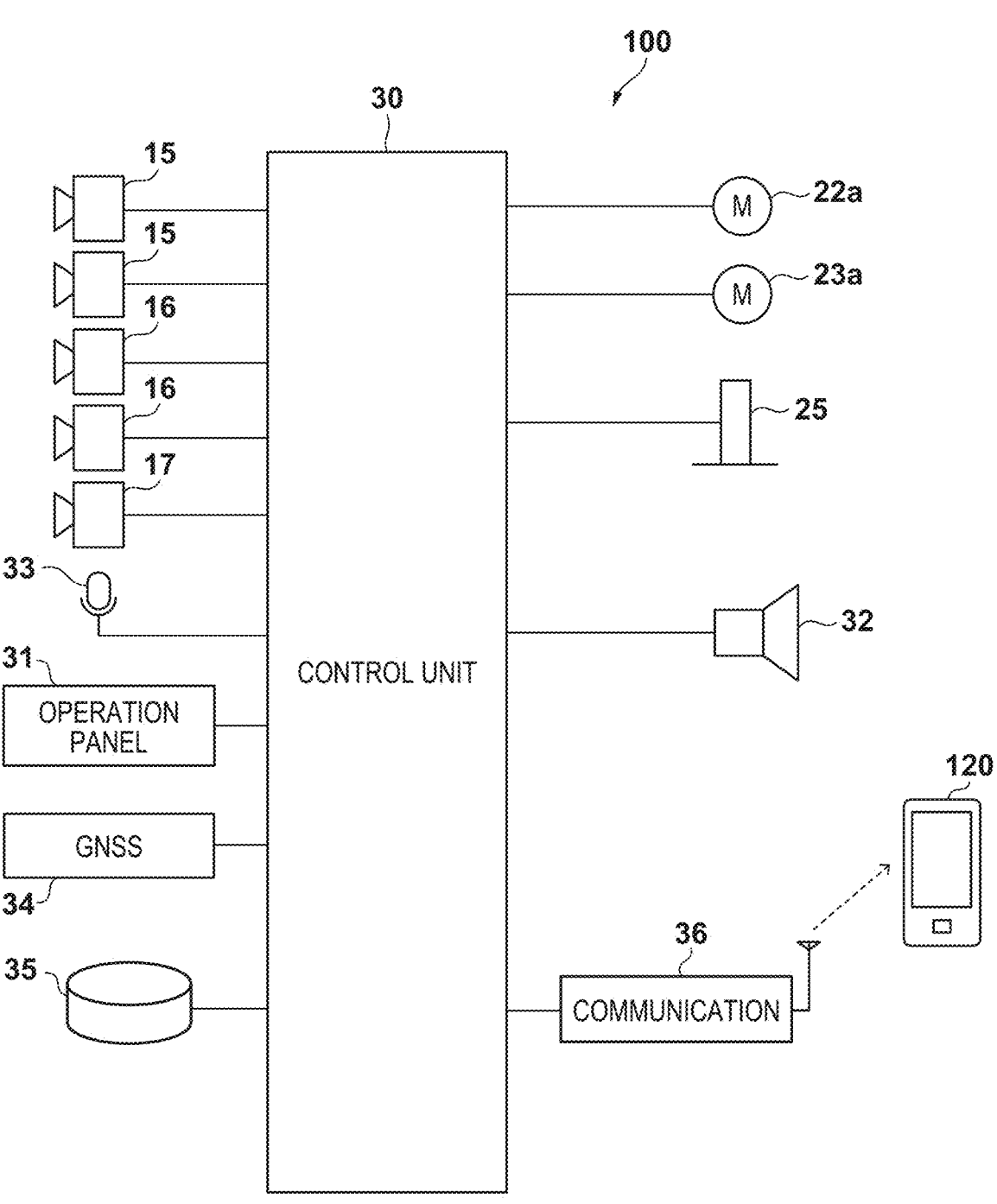

Figure 3:
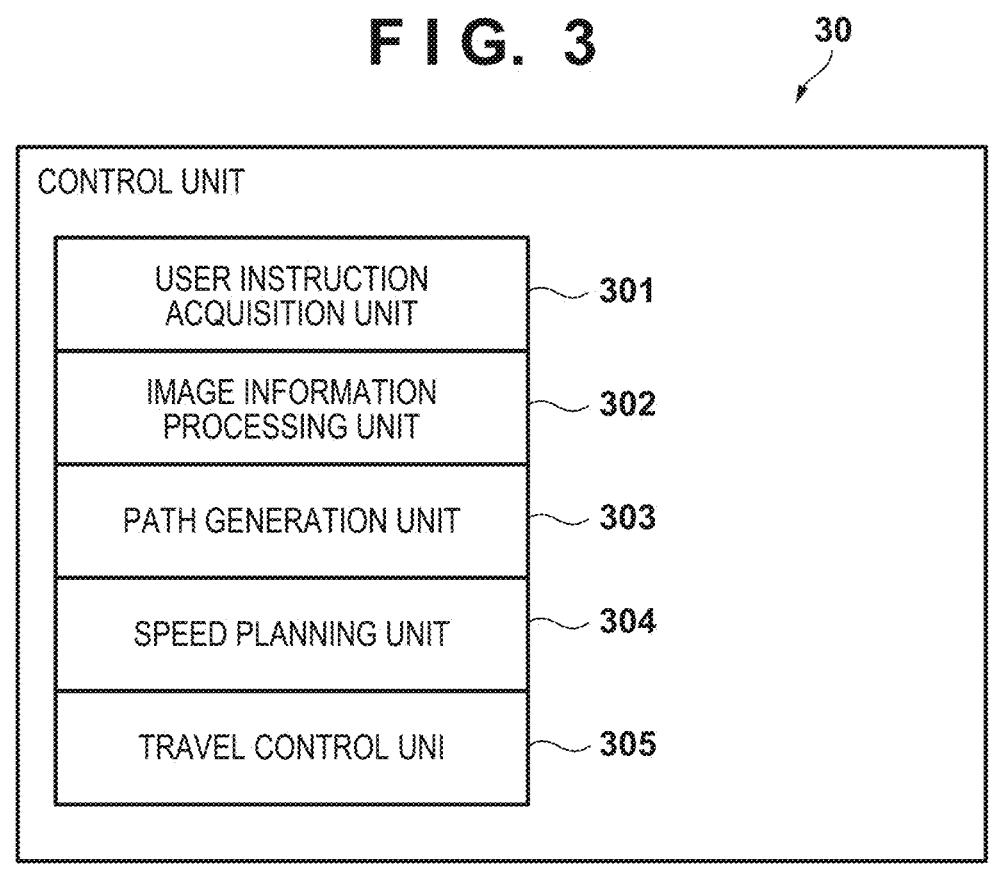

CONTROL UNIT

| USER INSTRUCTION ACQUISITION UNIT | 301 |

| IMAGE INFORMATION PROCESSING UNIT | 302 |

| PATH GENERATION UNIT | 303 |

| SPEED PLANNING UNIT | 304 |

| TRAVEL CONTROL UNI | 305 |

400

401

410

100

502

504 dg 505          503

INTERSECTION EXIT xg

501

CIRCLE

R d0

STRAIGHT
LINE

100

ENTRANCE POSITION xs

WHEN d0 > dg,
STRAIGHT LINE → SIMPLE
CIRCULAR CURVE

502

504 dg 505          503

STRAIGHT
LINE          INTERSECTION EXIT x

601 d0

R

CIRCLE

100

ENTRANCE
POSITION xs

WHEN d0 < dg,
SIMPLE CIRCULAR CURVE →
STRAIGHT LINE

F I G. 7

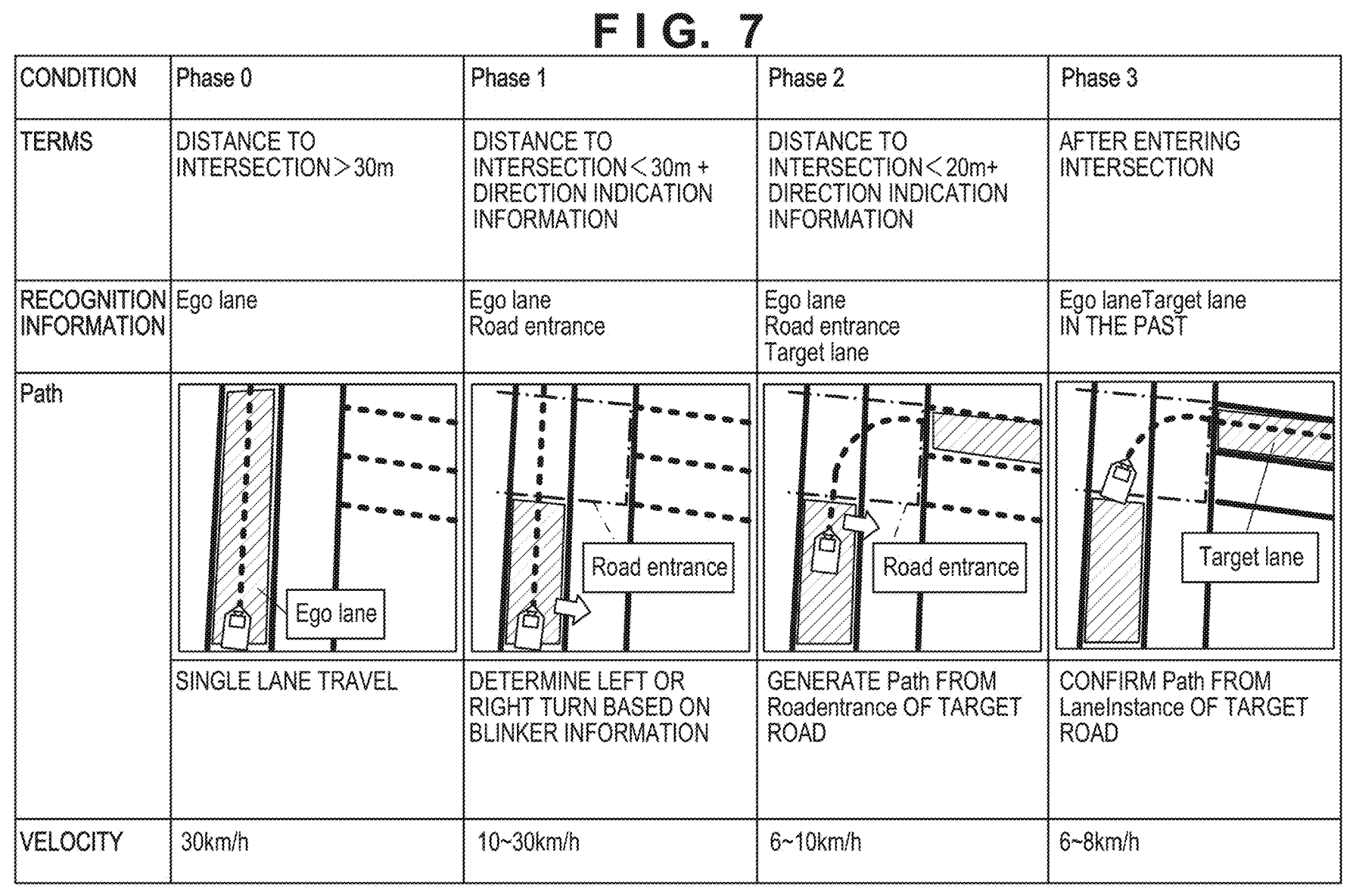

| CONDITION | Phase 0 | Phase 1 | Phase 2 | Phase 3 |
|---|---|---|---|---|
| TERMS | DISTANCE TO INTERSECTION>30m | DISTANCE TO INTERSECTION<30m + DIRECTION INDICATION INFORMATION | DISTANCE TO INTERSECTION<20m+ DIRECTION INDICATION INFORMATION | AFTER ENTERING INTERSECTION |
| RECOGNITION INFORMATION | Ego lane | Ego lane Road entrance | Ego lane Road entrance Target lane | Ego laneTarget lane IN THE PAST |
| Path | | | | |
| | SINGLE LANE TRAVEL | DETERMINE LEFT OR RIGHT TURN BASED ON BLINKER INFORMATION | GENERATE Path FROM Roadentrance OF TARGET ROAD | CONFIRM Path FROM LaneInstance OF TARGET ROAD |
| VELOCITY | 30km/h | 10~30km/h | 6~10km/h | 6~8km/h |

F I G. 8

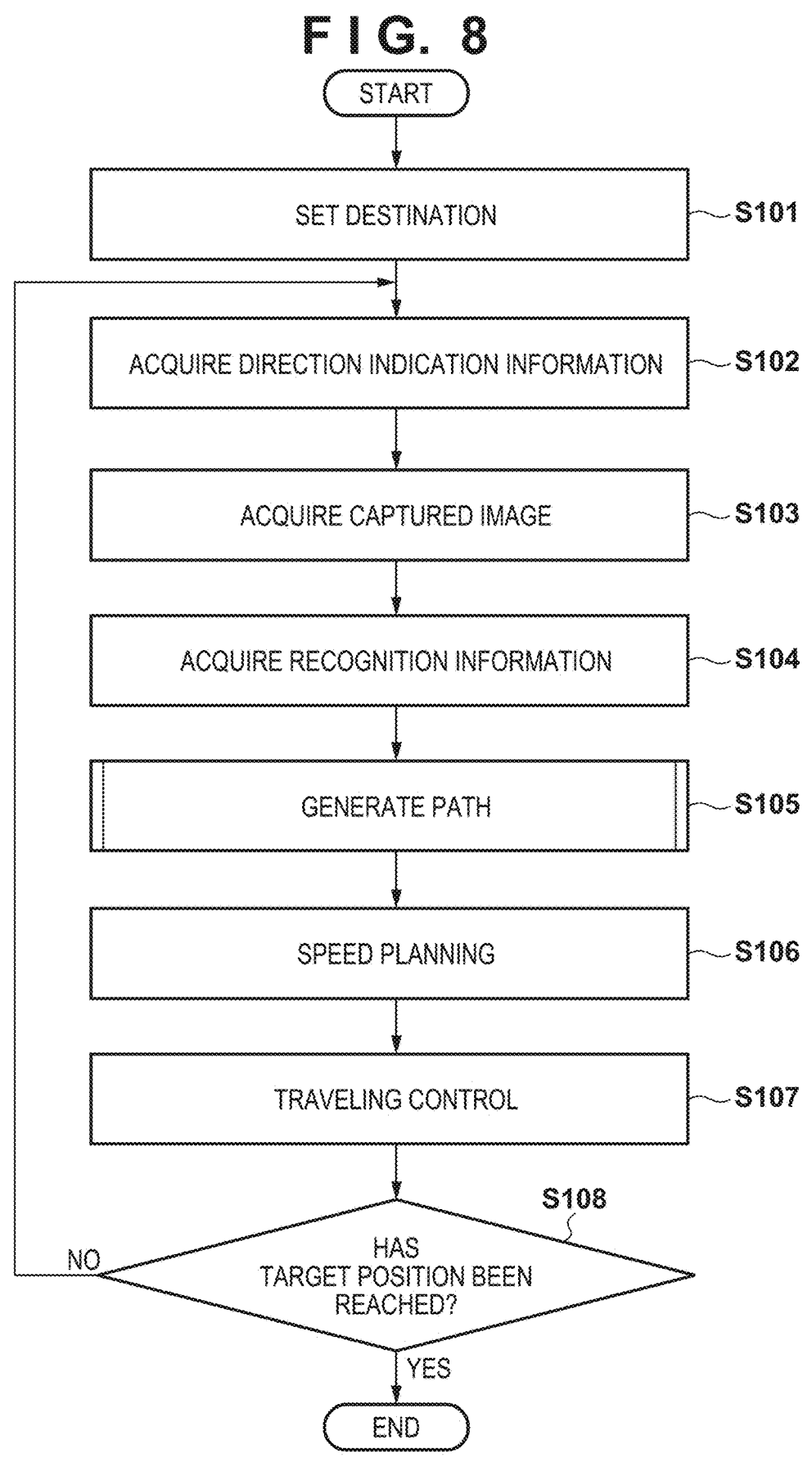

```
                    ┌─────────┐
                    │  START  │
                    └─────────┘
                         │
                         ▼
    ┌──────────────────────────────────────┐
    │           SET DESTINATION            │──── S101
    └──────────────────────────────────────┘
                         │
                         ▼
    ┌──────────────────────────────────────┐
    │  ACQUIRE DIRECTION INDICATION         │──── S102
    │  INFORMATION                          │
    └──────────────────────────────────────┘
                         │
                         ▼
    ┌──────────────────────────────────────┐
    │        ACQUIRE CAPTURED IMAGE         │──── S103
    └──────────────────────────────────────┘
                         │
                         ▼
    ┌──────────────────────────────────────┐
    │     ACQUIRE RECOGNITION INFORMATION   │──── S104
    └──────────────────────────────────────┘
                         │
                         ▼
    ┌──────────────────────────────────────┐
    │            GENERATE PATH             │──── S105
    └──────────────────────────────────────┘
                         │
                         ▼
    ┌──────────────────────────────────────┐
    │            SPEED PLANNING            │──── S106
    └──────────────────────────────────────┘
                         │
                         ▼
    ┌──────────────────────────────────────┐
    │          TRAVELING CONTROL          │──── S107
    └──────────────────────────────────────┘
                         │
                         ▼
                  ╱──────────────╲
            NO   ╱      HAS        ╲  S108
          ◄─────  TARGET POSITION BEEN
                 ╲     REACHED?    ╱
                  ╲──────────────╱
                         │
                        YES
                         ▼
                    ┌─────────┐
                    │   END   │
                    └─────────┘
```

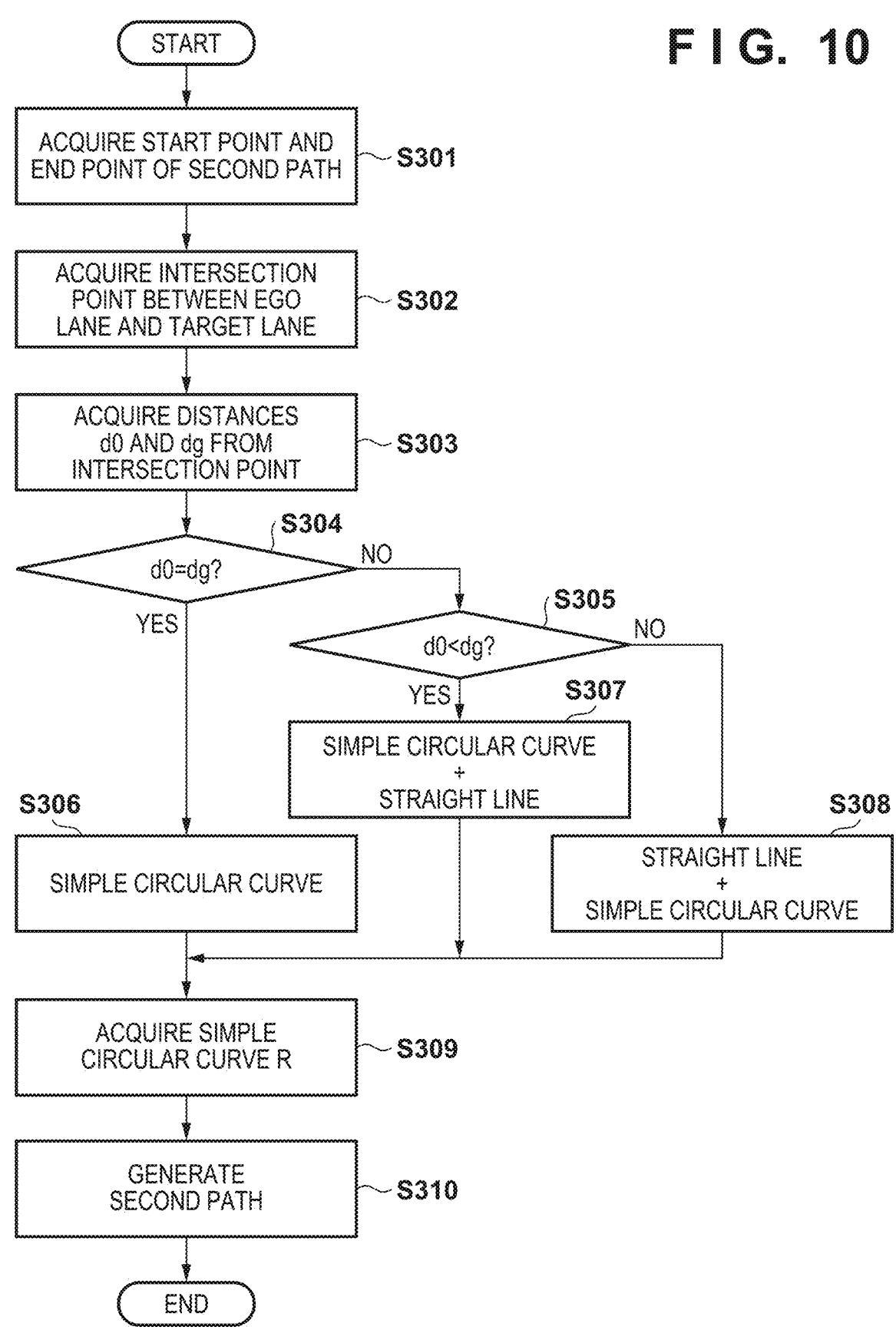
F I G. 10

MOVING BODY CONTROL SYSTEM, CONTROL METHOD, STORAGE MEDIUM, AND MOVING BODY

CROSS-REFERENCE TO RELATED APPLICATION(S)

This application is a continuation of International Patent Application No. PCT/JP2022/039961 filed on Oct. 26, 2022, the entire disclosures of which is incorporated herein by reference.

BACKGROUND OF THE INVENTION

Field of the Invention

The present invention relates to a moving body control system, a control method, a storage medium, and a moving body.

Description of the Related Art

In these years, a compact moving body is known such as an electric vehicle called ultra-compact mobility vehicle (also referred to as micro-mobility vehicle) having a riding capacity of about one or two persons, and a mobile robot that provides various types of services to humans. Some of such moving bodies autonomously travel while periodically generating a traveling route to a destination. Note that a compact moving body has insufficient hardware resources, and it is difficult to ensure an area for storing high-precision map information for generating a route and a communication device for acquiring a large amount of map information at high speed. Therefore, such a compact moving body is required to generate a route without using high-precision map information.

Japanese Patent Laid-Open No. 2016-43837 proposes that a road shape is recognized by extracting, in a curve section, a white line at a road edge from an image acquired by a camera or the like, acquiring the curvature of the white line, and estimating the white line in an extending direction outside a range of the captured image without using map information.

In the above conventional technique, by estimating that the curvature of a curve section is constant in the extending direction to extract a white line, a road shape in the extending direction is recognized. Therefore, although a road shape including a curve or the like, in which a white line continues, can be handled, a shape of an intersection or the like including a plurality of exits cannot be handled because a white line does not continue. If a road shape of an intersection or the like cannot be grasped, a route cannot be generated without using high-precision map information.

On the other hand, with an image captured by a camera or the like provided on a moving body, an image of an exit of an intersection cannot be captured before the moving body enters the intersection. Therefore, a mechanism is required to suitably generate a traveling route from a captured image for a road structure of an intersection or the like, in which a white line does not continue.

The present invention has been made in view of the above problem, and an object of the present invention is to suitably generate a traveling route for a road structure of an intersection or the like including an exit accompanied by a course change without using high-precision map information.

SUMMARY OF THE INVENTION

According to the present invention, it is possible to suitably generate a traveling route for a road structure of an intersection or the like including an exit accompanied by a course change without using high-precision map information.

Other features and advantages of the present invention will be apparent from the following description taken in conjunction with the accompanying drawings. Note that the same reference numerals denote the same or like components throughout the accompanying drawings.

According to the present invention, there is provided a moving body control system, comprising: imaging means for acquiring a captured image of a travel area of a destination of a moving body; recognition means for recognizing a road shape included in the captured image; and path generation means for generating a path of the moving body based on the road shape recognized by the recognition means, wherein the path generation means generates, when the recognition means recognizes a road shape including an entrance section and at least one exit section accompanied by a course change, a first path from a current position of the moving body to the entrance section, and a second path from the entrance section to an exit section to be identified in accordance with indication information about the destination of the moving body.

Further features of the present invention will become apparent from the following description of exemplary embodiments (with reference to the attached drawings).

BRIEF DESCRIPTION OF THE DRAWINGS

FIG. 2 is a block diagram illustrating a control configuration of the moving body according to the present embodiment.

FIG. 3 is a block diagram illustrating a functional configuration of the moving body according to the present embodiment.

FIG. 7 is a diagram illustrating an example of a path generation procedure at an intersection according to the present embodiment.

FIG. 8 is a flowchart illustrating a processing procedure for controlling the traveling of the moving body according to the present embodiment.

FIG. 10 is a flowchart illustrating a processing procedure of path generation at an intersection according to the present embodiment.

DESCRIPTION OF THE EMBODIMENTS

Figure 1A:
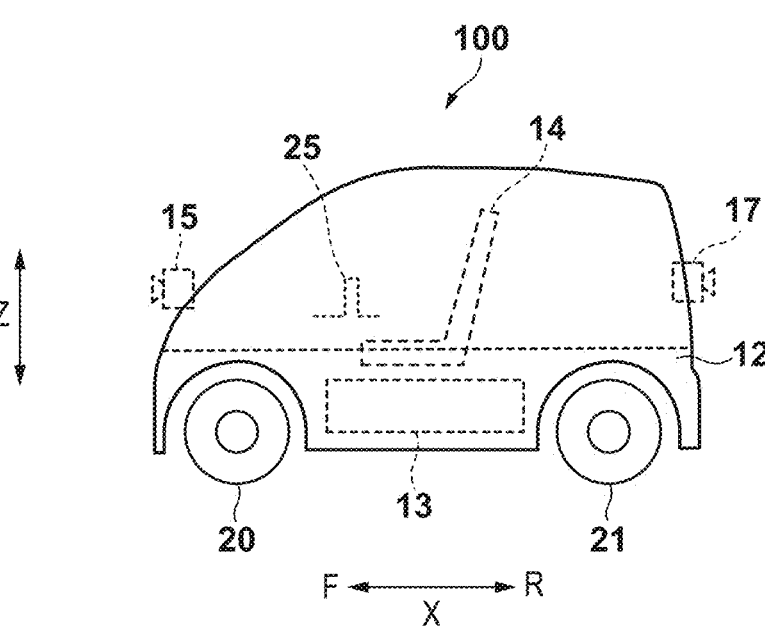
FIG. 1A is a block diagram illustrating a configuration example of hardware of a moving body according to the present embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration of Moving Body

Figure 1B:
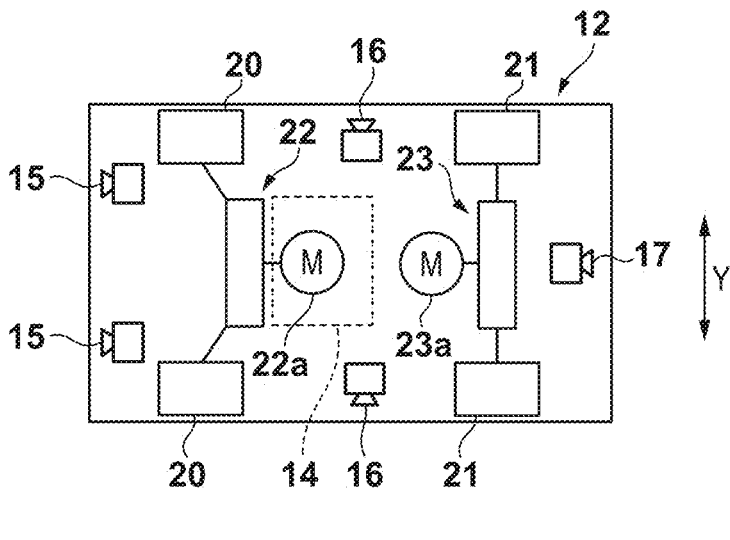
FIG. 1B is a block diagram illustrating a configuration example of the hardware of the moving body according to the present embodiment.

A configuration of a moving body 100 according to the present embodiment will be described with reference to FIG. 1. FIG. 1A illustrates a side view of the moving body 100 according to the present embodiment, and FIG. 1B illustrates an internal configuration of the moving body 100. In the drawings, an arrow X indicates a front-and-rear direction of the moving body 100, and F indicates the front, and R indicates the rear. Arrows Y and Z respectively indicate a width direction (a left-and-right direction) and an up-and-down direction of the moving body 100.

The moving body 100 includes a traveling unit 12, and is an ultra-compact mobility vehicle that moves mainly by the power of a motor using a battery 13 as a main power supply. The ultra-compact mobility vehicle is an ultra-compact vehicle that is more compact than a general automobile and has a riding capacity of about one or two persons. In the present embodiment, an ultra-compact mobility vehicle with four wheels will be described as an example of the moving body 100, but there is no intention to limit the present invention, and, for example, a three-wheeled vehicle or a straddle type vehicle may be used. In addition, the moving body according to the present invention is not limited to a vehicle, and may be a moving body that loads luggage and travels side by side with a person who is walking, or a moving body that leads a person. Furthermore, the present invention is not limited to a four-wheeled or two-wheeled vehicle, and is also applicable to a walking robot or the like capable of autonomously moving.

The battery 13 is, for example, a secondary battery, such as a lithium ion battery, and the moving body 100 autonomously travels by the traveling unit 12 by electric power supplied from the battery 13. The traveling unit 12 is a four-wheeled vehicle including a pair of left and right front wheels 20 and a pair of left and right rear wheels 21. The traveling unit 12 may be in another form, such as a form of a three-wheeled vehicle. The moving body 100 includes a seat 14 for one person or two persons. An operation unit 25 for an occupant to input a direction indication is provided in front of the seat 14. The operation unit 25 is any device for indicating a moving direction of the moving body 100, and, for example, a device capable of inputting in multiple directions, such as a joystick, is applicable. Before entering a road shape of, for example, an intersection or the like including an exit accompanied by a course change, a driver operates the operation unit 25 to indicate which direction of an exit to be taken.

The traveling unit 12 includes a steering mechanism 22. The steering mechanism 22 is a mechanism that changes the steering angle of the pair of front wheels 20 using a motor 22a as a drive source. By changing the steering angle of the pair of front wheels 20, the advancing direction of the moving body 100 can be changed. The traveling unit 12 also includes a drive mechanism 23. The drive mechanism 23 is a mechanism that rotates the pair of rear wheels 21 using a motor 23a as a drive source. By rotating the pair of rear wheels 21, the moving body 100 can be moved forward or rearward.

The moving body 100 includes detection units 15 to 17, each of which detects a target in the surroundings of the moving body 100. The detection units 15 to 17 are a group of external sensors that monitor the surroundings of the moving body 100. In the present embodiment, each detection unit is an imaging device that captures an image of the surroundings of the moving body 100, and includes, for example, an optical system, such as a lens, and an image sensor. However, instead of or in addition to the imaging device, a radar or a light detection and ranging (LiDAR) can also be used.

Two detection units 15 are disposed on a front part of the moving body 100 so as to be spaced apart from each other in the Y direction, and mainly detect a target on a front side of the moving body 100. The detection unit 16 is disposed on each of a left side part and a right side part of the moving body 100, and mainly detects a target on lateral sides of the moving body 100. The detection unit 17 is disposed on a rear part of the moving body 100, and mainly detects a target on a rear side of the moving body 100. In addition, in the present embodiment, an example in which the detection units are provided on the front, rear, left, and right of the moving body 100 will be described. However, there is no intention to limit the present invention, and the detection units may be provided only in a certain direction (for example, on a front side) of the moving body 100.

The moving body 100 according to the present embodiment captures an image of a forward area of the moving body 100 using at least the detection units 15, extracts a road shape from the captured image, and generates a route in accordance with recognition information indicating the extracted road shape and an operation instruction on the operation unit 25 by the driver, or information about a course change obtained from a route plan to a destination. As for the recognition information, a machine learning model output by a machine learning model that processes image information (captured images) performs, for example, arithmetic operations of a deep learning algorithm using a deep neural network (DNN), and recognizes a road shape included in the image information. The recognition information includes information about various lines and various lanes of roads, a lane in which a self-vehicle is located (Ego lane), various intersections (Intersection), entrances to various roads (Road entrance), and the like.

Control Configuration of Moving Body

FIG. 2 is a block diagram of a control system of the moving body 100 according to the present embodiment. Here, a configuration necessary for carrying out the present invention will be mainly described. Therefore, any other configuration may be further included in addition to the configuration to be described below. In addition, in the present embodiment, a description will be given assuming that each element to be described below is included in the moving body 100, but there is no intention to limit the present invention. A moving body control system including a plurality of devices may be achieved. For example, some functions of a control unit 30 may be achieved by a server device that is communicably connected, or the detection units 15 to 17 or a GNSS sensor 34 may be provided as external devices. The moving body 100 includes the control unit (ECU) 30. The control unit 30 includes a processor represented by a CPU, a storage device such as a semiconductor memory, an interface with an external device, and the like. The storage device stores a program to be executed by the processor, data to be used for processing by the processor, and the like. A plurality of sets of the processor, the storage device, and the interface may be provided for each function of the moving body 100 so as to be communicable with one another.

The control unit 30 acquires detection results of the detection units 15 to 17, input information of an operation panel 31, voice information input from a voice input device 33, position information from the GNSS sensor 34, direction indication information from the operation unit 25, and reception information via a communication unit 36, and performs corresponding processing. The control unit 30 controls the motors 22*a* and 23*a* (traveling control of the traveling unit 12), controls display of the operation panel 31, notifies the occupant of the moving body 100 by sounds of a speaker 32, and outputs information.

The voice input device 33 collects voices of the occupant of the moving body 100. The control unit 30 is capable of recognizing the input voices and performing corresponding processing. The global navigation satellite system (GNSS) sensor 134 receives a GNSS signal, and detects the current position of the moving body 100. A storage device 35 is a storage device that stores images captured by the detection units 15 to 17, obstacle information, routes generated in the past, an occupancy grid map, and the like. The storage device 35 may also store a program to be executed by the processor, data to be used for processing by the processor, and the like. The storage device 35 may store various parameters (for example, learned parameters of a deep neural network, hyperparameters, and the like) of a machine learning model for voice recognition or image recognition to be performed by the control unit 30.

The communication unit 36 communicates with a communication device 120, which is an external device, through wireless communication, such as Wi-Fi or 5th generation mobile communication. The communication device 120 is, for example, a smartphone, but is not limited to this, and may be an earphone-type communication terminal, a personal computer, a tablet terminal, a game machine, or the like. The communication device 120 is connected to a network through wireless communication, such as Wi-Fi or 5th generation mobile communication.

The user who possesses the communication device 120 can give an instruction to the moving body 100 via the communication device 120. The instruction includes, for example, an instruction for calling the moving body 100 to a position desired by a user for joining. When receiving the instruction, the moving body 100 sets a target position based on position information included in the instruction. Note that, in addition to such an instruction, the moving body 100 can set a target position from captured images of the detection units 15 to 17, or set a target position based on an instruction from a user who is on the moving body 100 via the operation panel 31. When a target position is set from the captured images, for example, a person raising a hand toward the moving body 100 in the captured images is detected, and a position of the detected person is estimated and set as the target position.

Functional Configuration of Moving Body

Next, a functional configuration of the moving body 100 according to the present embodiment will be described with reference to FIG. 3. In the control unit 30, the functional configuration described here is achieved, for example, by the CPU reading a program stored in a memory, such as a ROM, into a RAM and executing the program. Note that, the functional configuration described below describes only functions necessary for describing the present invention, and do not describe all of functional configurations actually included in the moving body 100. That is, the functional configuration of the moving body 100 according to the present invention is not limited to the functional configuration described below.

A user instruction acquisition unit 301 has a function of receiving an instruction from a user, and is capable of receiving a user instruction via the operation unit 25 or the operation panel 31, a user instruction from an external device, such as the communication device 120, via the communication unit 36, and an instruction by an utterance of the user via the voice input device 33. As described above, the user instruction includes an instruction for setting a target position (also referred to as a destination) of the moving body 100 and an instruction related to traveling control of the moving body 100.

An image information processing unit 302 processes captured images acquired by the detection units 15 to 17. Specifically, the image information processing unit 302 extracts a road shape recognized from the captured images acquired by the detection units 15 to 17. In addition, the image information processing unit 302 may include a machine learning model that processes image information, and may perform processing at a learning stage and processing at an inference stage of the machine learning model. By performing arithmetic operations of a deep learning algorithm using, for example, a deep neural network (DNN), the machine learning model of the image information processing unit 302 is capable of performing processing of recognizing a road shape or the like included in the image information. The recognition information indicating the recognized road shape includes, for example, information indicating a line such as a white line, a lane, a shape of an intersection, an entrance and an exit of the intersection, and the like.

A path generation unit 303 generates a traveling route (path) of the moving body 100 to the target position set by the user instruction acquisition unit 301. Specifically, the path generation unit 303 generates a path based on the road shape (recognition information) recognized from the captured images of the detection units 15 to 17 and the direction indication information via the operation unit 25, without requiring obstacle information in a high-precision map. Note that the recognition information is information about road shapes in a predetermined range from the moving body 100, and it is not possible to recognize road shapes farther than such a range. On the other hand, the recognition information is information periodically updated, as the moving body 100 advances. Therefore, a distant area is gradually recognized in accordance with the movement of the moving body 100. The path generation unit 303 generates a path in a sequential manner in accordance with the recognition information to be updated. In addition, the direction indication information is not limited to information received via the operation unit 25, and may be based on information about a course change obtained by a route plan to the destination. Therefore, in the present invention, the operation unit 25 is not an essential configuration, and the present invention is applicable to a moving body or the like that does not include the operation unit 25.

In addition, a speed planning unit 304 plans the speed in accordance with the curvature of the path generated by the path generation unit 303, and plans the speed based on the direction indication by the driver. For example, when an instruction to turn to the left or right is given at an intersection or the like, control is conducted in the speed plan so that the vehicle decelerates to 8 km for turning to the right, or decelerates to 6 km for turning to the left, before a curve starts from a straight line. By controlling the speed in accordance with the generated path and the instruction from the driver in this manner, rapid deceleration or the like can be avoided.

A travel control unit 305 controls the traveling of the moving body 100 in accordance with the generated path and the speed plan. Specifically, the travel control unit 305 controls the traveling unit 12 in accordance with the path and the speed plan to control the speed and the angular velocity of the moving body 100. When an operation of the driver causes a deviation from a driving plan of the path, the travel control unit 305 may acquire a new path generated by the path generation unit 303 again to control the traveling, or may control the speed and the angular velocity of the moving body 100 so as to eliminate the deviation from the path in use.

Captured Image

Figure 4A:
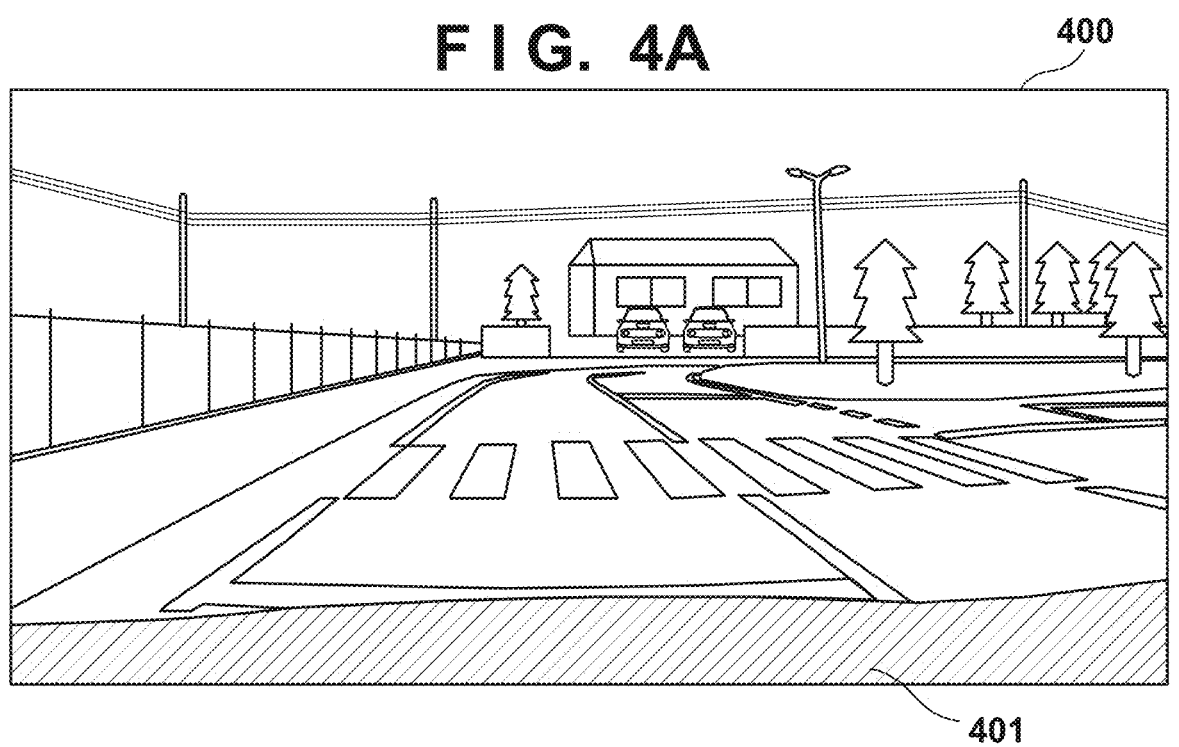
FIG. 4A is a diagram illustrating a captured image according to the present embodiment.
Figure 4B:
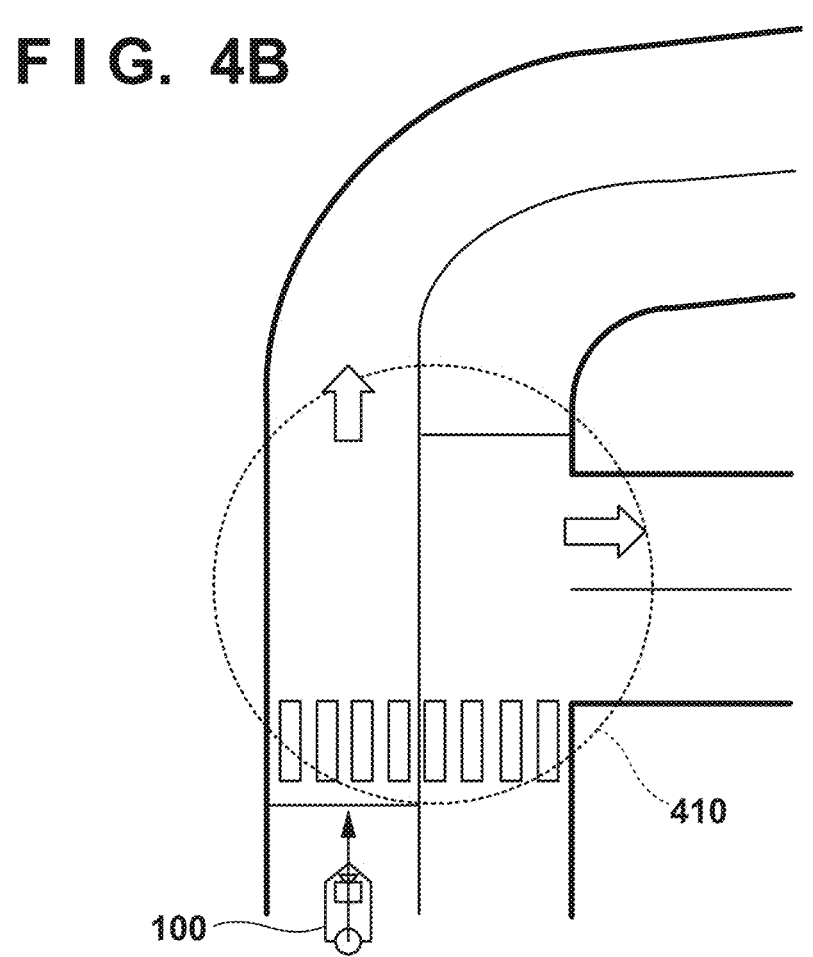
FIG. 4B is a diagram illustrating a road shape in the captured image according to the present embodiment.

FIG. 4A illustrates a captured image according to the present exemplary embodiment. FIG. 4B illustrates an example of a road shape included in the captured image of FIG. 4A. A captured image 400 illustrated in FIG. 4A is an image captured by the detection units 15 provided in the front part of the moving body 100. Note that a shaded area 401 indicates the inside of the cockpit of the moving body 100 captured and included in the captured image 400. Areas other than the shaded area 401 are areas where surrounding environments spreading on a forward area of the moving body 100 have been captured.

FIG. 4B illustrates the road shape included in the captured image 400 illustrated in FIG. 4A. A dotted area 410 indicates an intersection of a three-way junction (T junction). As illustrated in FIG. 4B, in the forward area of the moving body 100, an intersection of a three-way junction is present on a near side, and an exit after moving straight ahead in the advancing direction and an exit when turning to the right are present as exits from the intersection. A road largely curved to the right is continuous ahead of the exit after moving straight through the intersection. As illustrated in the captured image 400, in a viewpoint from the moving body 100 before entering the intersection 410, it is possible to recognize that a plurality of exits indicated by arrows is present, but it is not possible to recognize the road shapes ahead of the exits. Therefore, the moving body 100 according to the present embodiment generates a path in a sequential or stepwise manner using the road shape clarified as it moves. That is, as the moving body 100 approaches a predetermined road shape, the accuracy of the recognition increases, and the moving body 100 generates a path in accordance with the degree of recognition. In addition, when a plurality of exit sections is included in the road shape recognized from the captured image 400, or when at least one exit section is located outside a predetermined range from the current advancing direction, the moving body 100 according to the present embodiment determines that the road shape includes at least one exit section accompanied by a course change. In a case of such a determination, according to the present embodiment, it is determined that there is a possibility of a course change, and path generation to be described later is performed.

Path Generation Method

Figure 5:
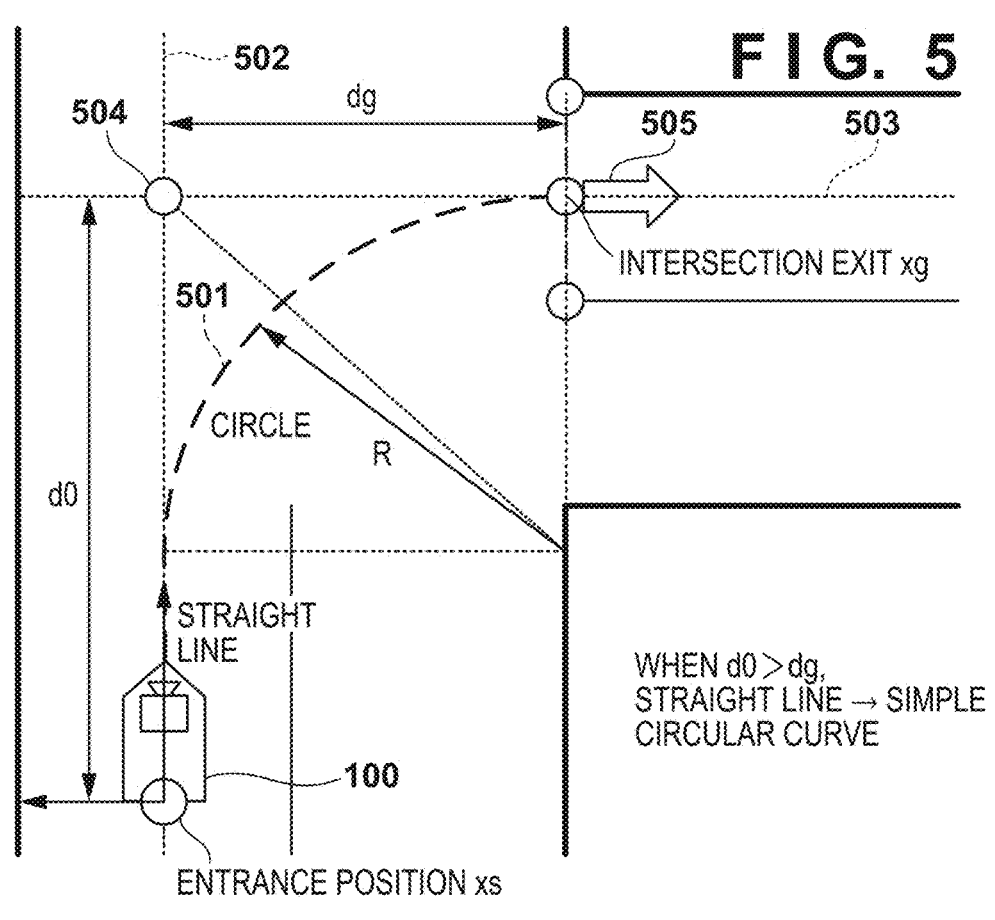
FIG. 5 is a diagram illustrating an example of a path generation method at an intersection according to the present embodiment.
Figure 6:
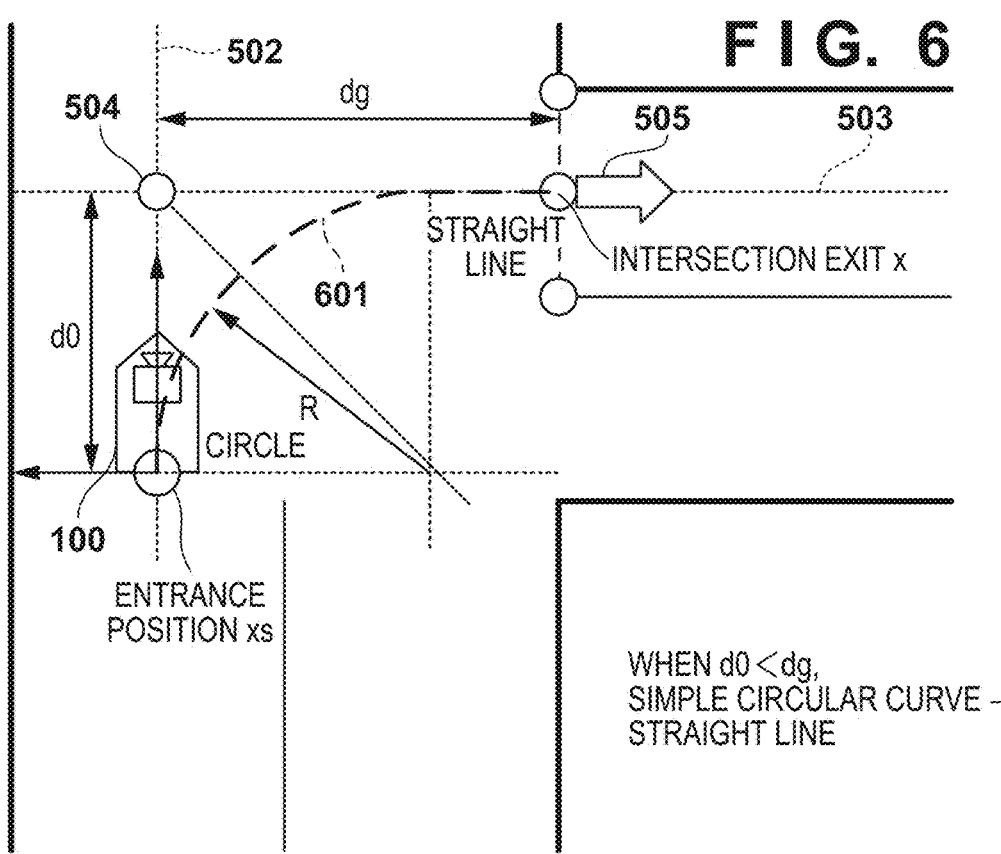
FIG. 6 is a diagram illustrating an example of the path generation method at an intersection according to the present embodiment.

FIGS. 5 and 6 illustrate a path generation method according to the present embodiment. Here, path generation when an instruction to turn to the right is received via the operation unit 25 when approaching the intersection (T-junction) illustrated in FIG. 4B will be described. Note that, in the present embodiment, a description will be given using a T junction as an example of a road shape including an entrance section and an exit section (Exit) accompanied by a course change. However, in the present invention, a travel area having a road shape including an entrance section and an exit section (Exit) accompanied by a course change, such as an intersection, a T junction, an entrance to a facility along a road, or a letter L-shape, may be applicable. The entrance to a facility along a road includes, for example, an entrance to a shopping mall, a gas station, a parking lot, or the like.

A reference sign 501 denotes a path to be generated at an intersection. Here, as illustrated in FIG. 5, a current position of the moving body 100 (or an intersection entrance) is represented as xs, and a target intersection exit is represented as xg. When an instruction to turn to the right is received via the operation unit 25, the path generation unit 303 acquires an intersection point 504 between a center line 502 of the lane on which the moving body 100 is traveling and a center line 503 of a target lane in order to generate a path that crosses the intersection. Here, the target lane indicates a lane leading to an exit when the moving body 100 passes through the intersection.

Subsequently, the path generation unit 303 acquires a distance d0 between the current position xs of the moving body 100 and the acquired intersection point 504, and a distance dg between the intersection exit xg and the intersection point 504. Furthermore, the path generation unit 303 compares the acquired distance d0 with the distance dg, and determines to generate a path having a simple circular curve followed by a straight line when d0<dg, or determines to generate a path having a straight line followed by a simple circular curve when d0>dg. When d0=dg, it is determined to generate a path having only a simple circular curve.

Next, the path generation unit 303 acquires the start point and the end point of the simple circular curve, and acquires the radius R from them. Then, the path generation unit 303 generates a path so as to include a simple circular curve and, if necessary, a straight line. The example in FIG. 5 illustrates that a path 501 including a straight line followed by a simple circular curve is generated when d0>dg. On the other hand, the example in FIG. 6 illustrates that a path 601 including a simple circular curve followed by a straight line is generated when d0<dg. Here, an example of a simple circular curve+a straight line or a straight line+a simple circular curve has been described, but there is no intention to limit the present invention. For example, depending on the current position of the moving body 100 or the shape of an intersection, a path including only a simple circular curve or a path including a straight line+a simple circular curve+a straight line can be generated. Note that, a simple circular curve has been described here as an example of a curve for ease of description, but any curve, such as a clothoid curve or a cubic curve, may be generated instead of or in addition to the simple circular curve.

Path Generation Procedure in Accordance With Recognition Situation

FIG. 7 illustrates a path generation procedure in accordance with a recognition situation at an intersection according to the present embodiment. Here, a description will be given with regard to a path generation procedure when approaching the intersection (T junction) illustrated in FIG. 4B. According to the present embodiment, a path in passing through a road shape of an intersection or the like including an entrance section and an exit section accompanied by a course change is generated in a sequential (stepwise) manner in accordance with recognition information about the road shape obtained from a captured image.

Here, an example in which path control is conducted in four stages in accordance with the distance between the moving body 100 and an intersection will be described. As illustrated in FIG. 7, Phase 0 is a state in which the distance from the moving body 100 to the intersection is more than 30 m. In this state, from the captured images acquired by the detection units 15 to 17, the image information processing unit 302 recognizes "Ego lane" indicating a travel area where the moving body 100 is traveling, but does not recognize the road shape of the intersection.

Phase 1 is a state in which the distance from the moving body 100 to the intersection is shorter than 30 m and an instruction to turn to the right has been received from the operation unit 25. In this state, the image information processing unit 302 is capable of recognizing the intersection, in addition to the above "Ego lane". Note that, regarding the recognition information about the intersection here, although the shape of the intersection and the entrance section ("Road entrance") are recognized, the exit section (Exit) or the travel area ahead of the intersection has not yet been recognized clearly.

The recognition information (for example, "Intersection" indicating an intersection or the like) about the road shape extracted by the image information processing unit 302 using the machine learning model includes various parameters in accordance with the recognition situation. The parameters include, for example, "Road entrance" indicating an entrance section or an exit section accompanied by a course change, information indicating a boundary of "Intersection", information indicating a white line (Line) of a road shape in the vicinity, information indicating a lane (Travel area, Lane), and the like. That is, depending on the recognition situation, only the parameter indicating the shape (Boundary) of the "Intersection" is included in some cases, and there is a possibility that a lane or a line of a branch destination has not yet been recognized.

Therefore, the path generation unit 303 has to generate and update a path in a sequential manner in accordance with such a recognition situation. In such Phase 1, although an instruction to turn to the right has been received, an exit section (Exit) of the intersection or a travel area ahead of it has not yet been identified. Therefore, the path generation unit 303 maintains the current path as a path, and does not generate a path for changing the course.

Phase 2 is a state in which the distance from the moving body 100 to the intersection is shorter than 20 m and an instruction to turn to the right has been received from the operation unit 25. In this state, the image information processing unit 302 recognizes a travel area "Target lane" ahead of it, in addition to the recognition information in the above Phase 1, and extracts an exit section to such a travel area. Note that, here, although the travel area "Target lane" is recognized, the line indicating the boundary of the travel area has not yet been recognized, and the accuracy of the recognition of the travel area is low. On the other hand, an exit section "Road entrance" of the intersection when turning to the right as instructed has been recognized clearly. This is because, for example, in Phase 2, as approaching the intersection, it becomes possible to clearly recognize the boundary of the intersection on a right-turn side, estimate its upper half as the traveling lane (travel area "Target lane"), and estimate its lower half as an opposite lane.

Therefore, in Phase 2, the path generation unit 303 generates a path for a course change based on information that can be recognized with higher accuracy. Specifically, the path generation unit 303 generates a first path from the current position of the moving body 100 to the already recognized entrance section "Road entrance" of the intersection, and a second path from the entrance section to the exit section "Road entrance" of the intersection on the right-turn side. The second path is generated by the path generation method described with reference to FIGS. 5 and 6, and includes a path including a curve, such as a simple circular curve, a clothoid curve, or a cubic curve. The second path may include a straight line in addition to such a curve. In addition, the second path may be generated as a path from the center of the entrance section to the center of the identified exit section.

Phase 3 is a state in which the moving body 100 has entered the intersection. In this state, in addition to the recognition information in the above Phase 2, the image information processing unit 302 is capable of further recognizing a white line (Line) indicating a boundary of a travel area "Target lane" ahead of it, and is capable of recognizing the travel area "Target lane" more accurately than in Phase 2. Therefore, in Phase 3, the path generation unit 303 generates a third path following the second path generated in Phase 2 and in the recognized travel area. Accordingly, it becomes possible to generate a path when a right-turn instruction is given at an intersection.

Note that, in the above Phase 3, the description has been given with regard to an example in which after the moving body 100 enters the intersection, the white line (for example, a line indicating a boundary of a lane "Lane instance") of the travel area "Target lane" is recognized, and the third path is generated at a timing when the travel area "Target lane" has been more accurately confirmed. However, there is no intention to limit the present invention. For example, instead of the timing when the travel area "Target lane" has been confirmed as described above, the path generation unit 303 may determine that the travel area "Target lane" has been confirmed to some extent when the moving body 100 moves ahead of the entrance section into the intersection, and generate the third path. Note that the timing when the moving body 100 moves ahead of the entrance section into the intersection is, that is, the timing when traveling on the second path is started. Alternatively, when the moving body 100 approaches from the identified exit section on the right-turn side to a predetermined distance, the path generation unit 303 may determine that the travel area "Target lane" has been confirmed to some extent, and generate the third path.

In addition, in the present invention, the description has been given with regard to an example in which a course change, such as turning to the left or right, is determined based on the direction indication information from the operation unit 25. However, there is no intention to limit the present invention. For example, when it is necessary to turn to the right at the next intersection while executing the route plan according to a preset destination, the path generation unit 303 may determine to turn to the right and generate a path without receiving the direction indication information as described above. In addition, when, for example, a left or right turn is required because the road ends in the advancing direction, and when the direction indication information from the operation unit 25 is not received, it may be determined to turn to the left or right, and a path may be generated. In this case, for example, a course change in a direction approaching a destination can be selected for the route plan to the destination.

In addition, according to the present embodiment, the speed planning unit 304 plans a target speed in each Phase, as illustrated in the row "speed" in FIG. 7. For example, when an instruction to turn to the left or right is received in a state in which an intersection has been recognized, a course change will occur. Therefore, it is necessary to decelerate to a predetermined speed (for example, the speed is 8 km/h for turning to the right, and 6 km/h for turning to the left), before reaching the entrance section of the intersection. Therefore, it is desirable that the speed planning unit 304 decelerates in a stepwise manner in each Phase in order to avoid sudden deceleration.

Basic Flow

FIG. 8 is a flowchart illustrating basic control of the moving body 100 according to the present embodiment. Processing to be described below is achieved by, for example, the CPU in the control unit 30 reading a program stored in a memory, such as a ROM into a RAM, and executing the program.

In S101, the control unit 30 sets a target position of the moving body 100 based on a user instruction received by the user instruction acquisition unit 301. The user instruction can be received in various methods as described above. Subsequently, in S102, the control unit 30 acquires direction indication information. Here, direction indication information when the driver operates the operation unit 25 and direction indication information about a course change determined in accordance with a set destination position are included. Here, as the processing of acquiring the direction indication information, the processing to be performed in S102 has been described for the sake of convenience. However, in practice, the processing is performed at any time as interruption processing at a timing when the driver operates the operation unit 25. Therefore, even after the processing in S102, the direction indication information is acquired by an operation interruption, and is used for path generation.

Next, in S103, the control unit 30 causes the detection units 15 to capture an image of a forward area of the moving body 100, and acquires the captured image. Then, in S104, the control unit causes the image information processing unit 302 to process the acquired captured image, and acquires recognition information indicating a road shape recognized using the machine learning model. Note that the processing in S103 and the processing in S104 are continuously or periodically performed, and the captured image and the recognition information acquired from the captured image are information to be updated as needed.

Next, in S105, the control unit 30 causes the path generation unit 303 to generate a path of the moving body 100 in accordance with the recognition information acquired in S104. A detailed procedure of path generation by the path generation unit 303 will be described later with reference to FIG. 9. Subsequently, in S106, the control unit 30 generates a speed plan of the moving body 100 based on the generated path and the direction indication information. Furthermore, in S107, the control unit 30 causes the travel control unit 305 to determine the speed and the angular velocity of the moving body 100, and controls the traveling. Then, in S108, the control unit 30 determines whether the moving body 100 has reached the target position based on position information from the GNSS sensor 34, and when the moving body 100 has not reached the target position, the control unit 30 returns the processing to S102, generates a path while updating the captured image, and repeatedly performs processing of controlling the traveling. On the other hand, when the moving body 100 has reached the target position, the processing of this flowchart is ended.

Processing Procedure of Path Generation

Figure 9:
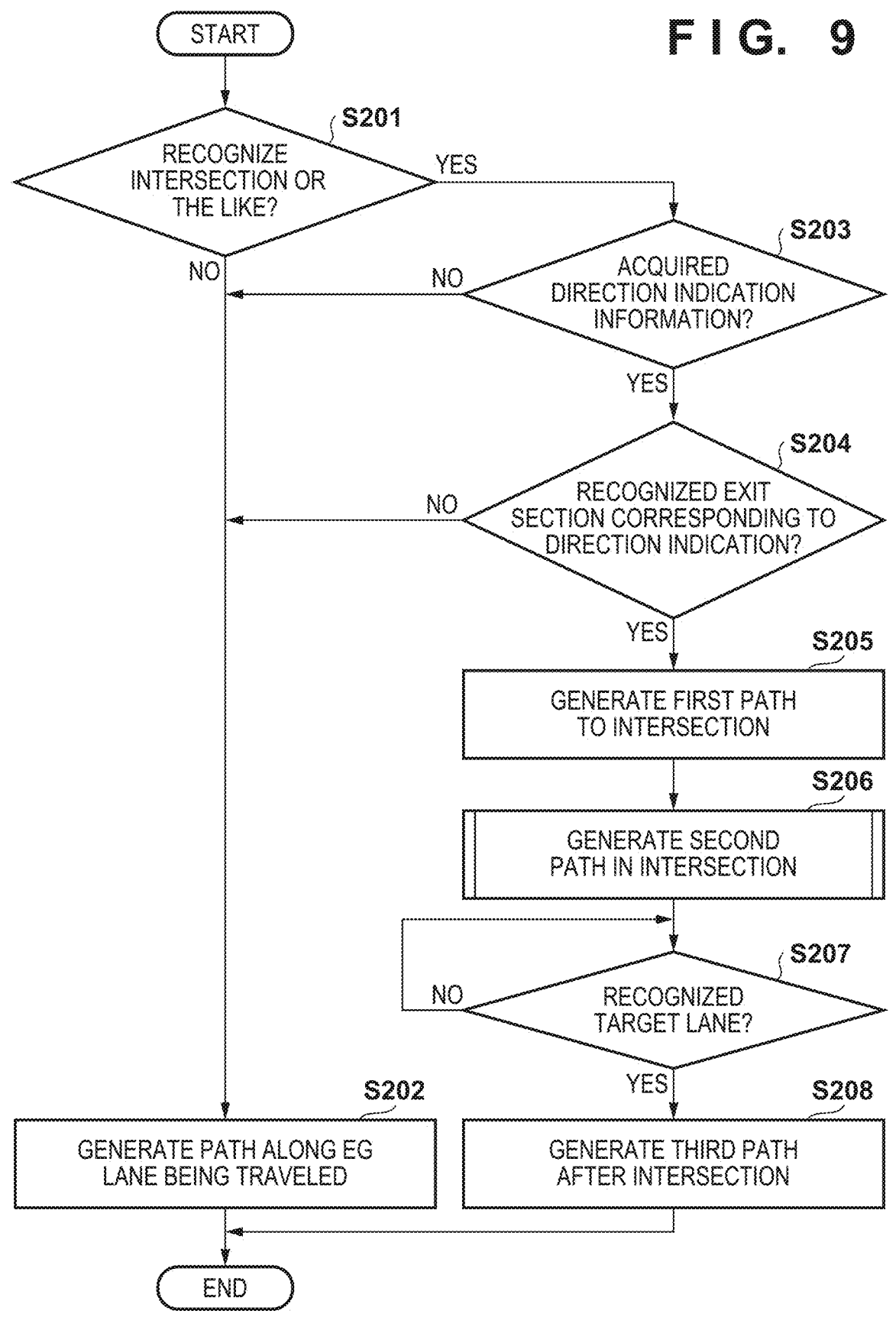
FIG. 9 is a flowchart illustrating a processing procedure of path generation according to the present embodiment.

FIG. 9 is a flowchart illustrating a detailed processing procedure of path generation (S105) according to the present embodiment. Processing to be described below is achieved by, for example, the CPU in the control unit 30 reading a program stored in a memory, such as a ROM into a RAM, and executing the program.

First, in S201, the path generation unit 303 determines whether the recognition information acquired in S104 includes information indicating an intersection or the like including an exit section accompanied by a course change. Specifically, when a plurality of exit sections is included in the road shape indicated by the acquired recognition information, or when at least one exit section is located outside a predetermined range from the current advancing direction, the path generation unit 303 determines that the road shape includes at least one exit section accompanied by a course change. Note that, here, the reason why "at least one" exit section is used is because there is a possibility that another exit section is newly recognized as the moving body 100 approaches an intersection or the like. That is, since there is a possibility that the number of exit sections to be recognized increases as the moving body 100 moves, the possibility that the number of exit sections accompanied by a course change increases is taken into consideration. When at least one exit section accompanied by a course change is included, the processing proceeds to S203, and when it is not included, the processing proceeds to S202. In S202, the path generation unit 303 generates a path in a predetermined range along the traveling Ego lane, and ends the processing of this flowchart.

On the other hand, in S203, the path generation unit 303 determines whether the direction indication information has been acquired in S102. When it has not been acquired, the processing proceeds to S202, and when it has been acquired, the processing proceeds to S204. In S204, the path generation unit 303 determines whether the exit section identified by the acquired direction indication information has been recognized among a plurality of exit sections included in the intersection or the like. When it has not been recognized, the processing proceeds to S202, and when it has been recognized, the processing proceeds to S205.

In S205, as control to generate a path for a course change, the path generation unit 303 first generates a first path from the current location of the moving body 100 to the entrance section of the intersection or the like. The first path basically has a straight line shape, and is a path connecting the center of the ego lane and the center of the entrance section having a predetermined width. Subsequently, in S206, the path generation unit 303 generates a second path in the intersection following the first path. Detailed processing will be described later using FIG. 10.

Next, in S207, the path generation unit 303 determines whether a target travel area existing ahead of the exit section identified as a destination has been recognized. Whether or not the target travel area has been recognized is determined in accordance with each parameter of the road shape recognized by the image information processing unit 302 as described above. Here, for example, when a white line for identifying the shape of the target travel area is recognized, it is determined that the travel area has been recognized. Note that, instead of such a determination, it may be determined that the travel area has been recognized at a timing when the traveling on the second path is started, a timing when the distance from the moving body 100 to the identified exit section approaches a predetermined distance, or the like. When the target travel area has been recognized, the processing proceeds to S208, and the path generation unit 303 generates a third path from the identified exit section in accordance with the recognized travel area, and returns the processing to S104.

Path Generation at Intersection or the Like

FIG. 10 is a flowchart illustrating a detailed processing procedure for generating the second path (S206) according to the present embodiment. Processing to be described below is achieved by, for example, the CPU in the control unit 30 reading a program stored in a memory, such as a ROM into a RAM, and executing the program.

In S301, the path generation unit 303 acquires the start point and the end point of the second path. The start point of the second path is, for example, the center of the entrance section. The end point is, for example, the center of the identified exit section. Subsequently, in S302, the path generation unit 303 acquires an intersection point between a straight line (for example, the center line of the ego lane) along the advancing direction of the moving body 100 and a straight line (for example, the centerline of the target lane) along the advancing direction to the destination. Subsequently, in S303, the path generation unit 303 acquires a first distance d0 from the start point to the intersection point and a second distance dg from the intersection point to the end point.

Then, in S304 and S305, the path generation unit 303 compares the first distance d0 with the second distance dg, and determines whether to generate a straight line in addition to a simple circular curve. Specifically, when the first distance d0 is equal to the second distance dg, the processing proceeds to S306, and the path generation unit 303 determines to generate a simple circular curve as a curved route and proceeds to S309. When the first distance d0 is shorter than the second distance dg, the processing proceeds to S307, and the path generation unit 303 determines to generate a simple circular curve from the start point as a curved route and to generate a straight line to the end point following the generated simple circular curve, and proceeds to S309. When the first distance d0 is longer than the second distance dg, the processing proceeds to S308, and the path generation unit 303 determines to generate a straight line from the start point and to generate a simple circular curve to the end point following the generated straight line as a curved route, and proceeds to S309. In S309, the path generation unit 303 acquires the radius R of the simple circular curve to be generated. Subsequently, in S310, the path generation unit 303 generates a route including a curve in accordance with the determinations in S306 to S308, and returns the processing to S306.

Summary of Embodiments

1. A moving body control system (e.g. 100) according to the above embodiments, comprising:

imaging means (e.g. 15-17) for acquiring a captured image of a travel area of a destination of a moving body;

recognition means (e.g. 302) for recognizing a road shape included in the captured image; and path generation means (e.g. 303) for generating a path of the moving body based on the road shape recognized by the recognition means, wherein the path generation means generates, when the recognition means recognizes a road shape including an entrance section and at least one exit section accompanied by a course change, a first path from a current position of the moving body to the entrance section, and a second path from the entrance section to an exit section to be identified in accordance with indication information about the destination of the moving body (e.g. 303, S205, S206 and FIG. 7).

According to the embodiment, it is possible to suitably generate a traveling route for a road structure of an intersection or the like including a plurality of exits without using high-precision map information.

2. In the moving body control system of the above embodiments, wherein the path generation means generates a path from a center of the entrance section to a center of the identified exit section as the second path (e.g. FIGS. 5-6).

According to the embodiment, it is possible to suitably generate a traveling route for a road structure of an intersection or the like including an exit accompanied by a course change without using high-precision map information.

3. In the moving body control system of the above embodiments, wherein the path generation means generates, when the recognition means recognizes a travel area following the identified exit section while the moving body travels along the first path or the second path, a third path following the second path and in the recognized travel area (e.g. S208, FIG. 7).

According to the embodiment, it is possible to suitably generate a traveling route for a road structure of an intersection or the like including an exit accompanied by a course change without using high-precision map information.

4. In the moving body control system of the above embodiments, wherein the path generation means generates, when the moving body starts traveling on the second path, a third path following the second path, the third path being in a travel area following the identified exit section to be recognized by the recognition means (e.g. S208, FIG. 7).

According to the embodiment, it is possible to suitably generate a traveling route for a road structure of an intersection or the like including an exit accompanied by a course change without using high-precision map information.

5. In the moving body control system of the above embodiments, wherein the path generation means generates, when the moving body approaches from the identified exit section to a predetermined distance, a third path following the second path, the third path being in a travel area following the identified exit section to be recognized by the recognition means (e.g. S208, FIG. 7).

According to the embodiment, it is possible to suitably generate a traveling route for a road structure of an intersection or the like including an exit accompanied by a course change without using high-precision map information.

6. In the moving body control system of the above embodiments, wherein the road shape including the entrance section and the at least one exit section accompanied by the course change is any of an intersection, a T junction, and a travel area including an entrance to a facility along a road.

According to the embodiment, it is possible to suitably generate a traveling route for a road shape as long as it includes an entrance section and an exit section accompanied by a course change without using high-precision map information.

7. In the moving body control system of the above embodiments, further comprising direction indication means for receiving the indication information about the destination of the moving body (e.g. 25).

According to this embodiment, it is possible to generate a traveling route in accordance with the intention of a driver.

8. In the moving body control system of the above embodiments, wherein the path generation means generates, when the direction indication means does not receive the indication information and when a course change is necessary, the second path to an exit section to be identified in response to the course change.

According to this embodiment, it is possible to suitably generate a traveling route without using high-precision map information when a course change occurs in accordance with a route plan or when a vehicle travels on a road having a structure that requires a course change.

9. In the moving body control system of the above embodiments, wherein the path generation means generates, when a course change occurs, a path including at least a simple circular curve as the second path (e.g. FIGS. 5, 6 and 10).

According to this embodiment, it is possible to easily generate a smooth path even when a course change occurs at an intersection or the like.

10. In the moving body control system of the above embodiments, further comprising:

speed planning means (e.g. 304) for generating a speed plan of the moving body in accordance with the path generated by the path generation means and the indication information about the destination of the moving body; and travel control means (e.g. 305) for controlling travelling of the moving body in accordance with the path generated by the path generation means and the speed plan generated by the speed planning means.

According to this embodiment, it is possible to easily generate a smooth path and to avoid sudden deceleration or the like even when a course change occurs at an intersection or the like.

11. In the moving body control system of the above embodiments, wherein the path generation means determines, when a plurality of exit sections is included or when at least one exit section is located outside a predetermined range from a current advancing direction in the road shape recognized by the recognition means, that the road shape recognized by the recognition means includes at least one exit section accompanied by a course change (e.g. 303, S205, S206 and FIG. 7).

According to this embodiment, it is possible to suitably determine an intersection or the like accompanied by a course change.

The invention is not limited to the foregoing embodiments, and various variations/changes are possible within the spirit of the invention.

What is claimed is:

1. A moving body control system, comprising:
an imaging device configured to acquire a captured image of a travel area of a destination of a moving body;

at least one processor circuit with a memory comprising instructions that, when executed by the at least one processor circuit, cause the at least one processor circuit to at least:

recognize a road shape included in the captured image;

generate a path of the moving body based on the road shape recognized in the captured image, wherein when the road shape is recognized, where the road shape includes an entrance section and at least one exit section accompanied by a course change, the generation of the path further comprises generating a first path from a current position of the moving body to the entrance section, and a second path from the entrance section to an exit section to be identified in accordance with indication information about the destination of the moving body; and control traveling of the moving body in accordance with the generated path;

wherein the second path is generated from a center of the entrance section to a center of the identified exit section; and wherein when the travel area is recognized following the identified exit section while the moving body travels along the first path or the second path, the instructions further cause the at least one processor to generate a third path following the second path in the recognized travel area.

2. The moving body control system according to claim 1, wherein, when the moving body starts traveling on the second path, the instructions further cause the at least one processor to generate the third path following the second path, the third path being in the travel area following the identified exit section to be recognized in the road shape included in the captured image.

3. The moving body control system according to claim 1, wherein, when the moving body approaches from the identified exit section to a predetermined distance, the instructions further cause the at least one processor to generate the third path following the second path, the third path being in the travel area following the identified exit section to be recognized in the road shape included in the captured image.

4. The moving body control system according to claim 1, wherein the instructions further cause the at least one processor to generate, when a course change occurs, the second path including at least a simple circular curve.

5. The moving body control system according to claim 1, wherein the road shape including the entrance section and the at least one exit section accompanied by the course change is any of an intersection, a T junction, and the travel area including an entrance to a facility along a road.

6. The moving body control system according to claim 1, further comprising the instructions further causing the at least one processor to receive the indication information about the destination of the moving body.

7. The moving body control system according to claim 6, wherein, when the at least one processor does not receive the indication information and, when a course change is necessary, the instructions further cause the at least one processor to generate the second path to the exit section to be identified in response to the course change.

8. The moving body control system according to claim 1, wherein the instructions further cause the at least one processor to:

generate a speed plan of the moving body in accordance with the generated path and the indication information about the destination of the moving body; and further control travelling of the moving body in accordance with the generated speed plan.

9. The moving body control system according to claim 1, wherein the instructions further cause the at least one processor to determine, when a plurality of exit sections is included or when at least one exit section is located outside a predetermined range from a current advancing direction in the recognized road shape, that the recognized road shape includes at least one exit section accompanied by the course change.

10. A non-transitory storage medium comprising the instructions according to claim 1.

11. A control method of a moving body control system, the control method comprising:

an imaging step of acquiring a captured image of a travel area of a destination of a moving body;

a recognition step of recognizing a road shape included in the captured image;

a path generation step of generating a path of the moving body based on the road shape recognized in the recognition step; and a control step of controlling traveling of the moving body in accordance with the generated path;

wherein the generating of the path further includes generating, when the road shape includes an entrance section and at least one exit section accompanied by a course change is recognized in the recognition step, a first path from a current position of the moving body to the entrance section, and a second path from the entrance section to an exit section to be identified in accordance with indication information about the destination of the moving body, wherein the second path is generated from a center of the entrance section to a center of the identified exit section; and the path generation step includes generating a third path following the second path in the recognized travel area when the travel area is recognized following the identified exit section while the moving body travels along the first path or the second path.

12. A moving body, comprising:

an imaging device configured to acquire a captured image of a travel area of a destination;

at least one processor circuit with a memory comprising instructions that, when executed by the at least one processor circuit, cause the at least one processor circuit to at least:

recognize a road shape included in the captured image;

generate a path of the moving body based on the recognized road shape; and control traveling of the moving body in accordance with the generated path;

wherein when the recognized road shape includes an entrance section and at least one exit section accompanied by a course change, the generation of the path further comprises generating a first path from a current position of the moving body to the entrance section, and a second path from the entrance section to an exit section to be identified in accordance with indication information about the destination of the moving body, wherein the second path is generated from a center of the entrance section to a center of the identified exit section; and when the travel area is recognized following the identified exit section while the moving body travels along the first path or the second path, the instructions further cause the at least one processor to generate a third path following the second path in the recognized travel area.

* * * * *